March 21, 1961 P. A. DODGE 2,976,474
ELECTRONIC VOLTAGE REGULATOR
Filed Oct. 12, 1956
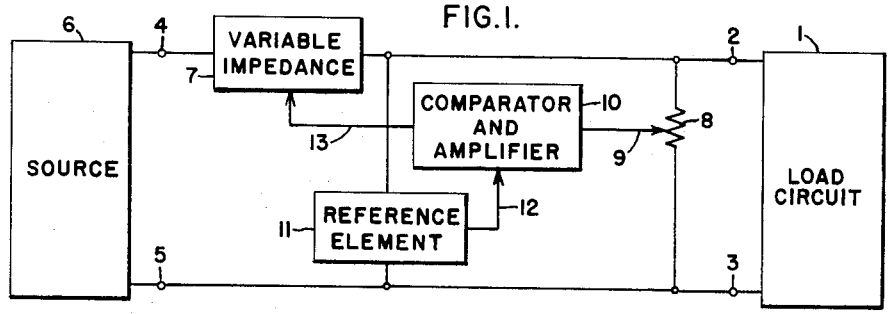
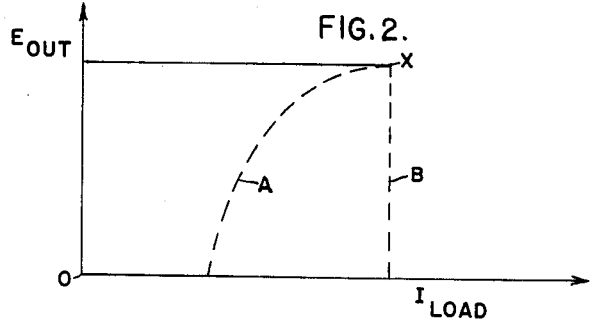
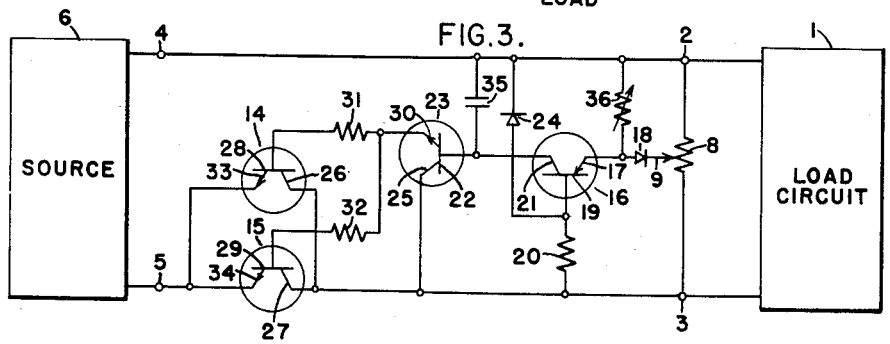
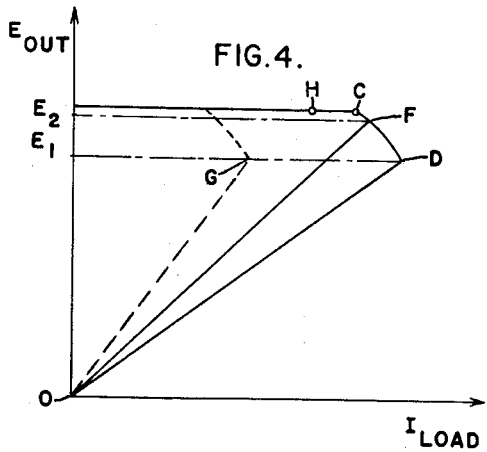
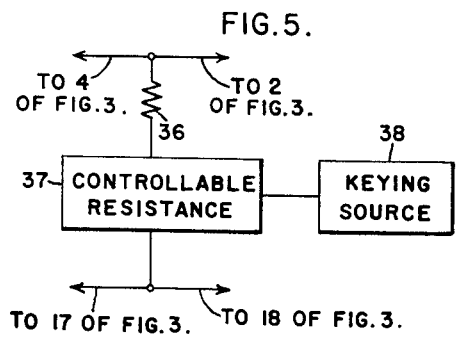
INVENTOR:
PAUL A. DODGE,
BY Michael Masnik
HIS AGENT.

United States Patent Office 2,976,474
Patented Mar. 21, 1961

2,976,474

ELECTRONIC VOLTAGE REGULATOR

Paul A. Dodge, Baldwinsville, N.Y., assignor to General Electric Company, a corporation of New York Filed Oct. 12, 1956, Ser. No. 615,645

5 Claims. (Cl. 323—9)

My invention relates to regulating devices, and more particularly to electrical signal regulators.

It is oftentimes desirable to control the voltage supplied from a source to a load circuit to within predetermined levels irrespective of variations in the source and the load circuit. Where the power to be applied to a load circuit is obtained from a source of poor regulation, it is common to employ an electronic voltage regulator between the source and the load circuit to maintain the voltage at the load circuit substantially constant. Previous voltage regulators of this type have suffered from certain short-comings. To insure proper output overload and input undervoltage protection it has been necessary in these prior art devices to employ fuses, relays and other objectionable circuit protective elements. Use of these devices was necessary since an unprotected regulator will suffer damage when subjected to an overload or undervoltage condition.

It is an object of my invention to provide a new and improved electronic voltage regulator.

It is another object of my invention to provide a new and improved voltage regulator capable of satisfactory performance over wide operating conditions.

It is a further object of my invention to provide improved overload and/or undervoltage protection for electrical circuits.

It is a further object of my invention to provide an improved signal control arrangement.

It is a further object of my invention to provide an improved signal processing arrangement.

Applicant has applied the teachings of his invention in particular to a transistorized voltage regulating arrangement. In the prior art devices, the regulating arrangements attempted to maintain a constant output voltage regardless of the excessive nature of the overload conditions. This ultimately resulted in the destruction of the regulating arrangement itself. In the present invention, applicant makes use of novel circuitry to detect and signal an approaching overload condition. This signal causes the regulating arrangement to cease its normal operation and become effectively a high impedance, thereby preventing any damage to the overall circuitry.

For better understanding of my invention, reference is made to the following description taken in connection with the accompanying drawings and the appended claims, wherein Fig. 1 illustrates in block diagram form the principles of a conventional series voltage regulating circuit, Fig. 2 illustrates in graphic form the operating characteristics of a more desirable voltage regulating arrangement, Fig. 3 illustrates in circuit diagram form a transistorized embodiment of the present invention, Fig. 4 illustrates in graphic form the desirable characteristics attained with the arrangement of Fig. 3, and Fig. 5 illustrates a method of modifying the circuit arrangement of Fig. 3 to provide auxiliary control of the power applied to the load circuit.

Referring now to Fig. 1 there is shown an output or load circuit 1 having its input terminals 2 and 3 connected to the output terminals 4 and 5 of a source 6 of unregulated voltage. In order to maintain a constant voltage across terminals 2 and 3, independent of variations in the impedance of the load circuit 1 and the source 6, a regulating arrangement is provided. This regulating arrangement comprises a variable impedance 7, placed between source output terminal 4 and load input terminal 2, which is made responsive to the variations in the voltage developed across load resistor 8 in a manner to cause the voltage developed across resistor 8 to be kept constant. To accomplish this, a portion of the voltage developed across load resistor 8 is selected by the movable tap 9 and applied to the comparator and amplifier 10. The comparator and amplifier compare the voltage signal picked up by the movable tap 9 with a fixed reference voltage signal provided by the reference element 11 over lead 12. The result of this comparison provides a suitable signal over lead 13 to the variable impedance 7 causing the impedance of device 7 to change in the proper direction to maintain the voltage developed across resistor 8 constant.

In a typical operation, should the voltage developed across load resistor 8 rise, a signal is developed over lead 13 causing the impedance of device 7 to increase and return the voltage across 8 to its desirable level. Similarly, if the voltage across load resistor 8 should decrease, a signal is developed at lead 13 causing the impedance of device 7 to decrease and therefore return the voltage developed across 8 to its normal, desirable level.

Referring to Fig. 2 there is shown, graphically, a voltage regulating characteristic wherein the current developed in the load circuit is plotted as abscissa and the voltage developed across the load circuit is plotted as ordinate. In the normal case, the voltage regulating circuit attempts to maintain a constant output voltage with increasing load current as shown by the solid line. Without suitable protection, a point is reached where the load current becomes so excessive that the normal regulating arrangement would be destroyed. Where the concern is excessive load current, it would be desirable to provide a voltage regulating characteristic which would function at a maximum predetermined load current condition, such as at X, to return the output voltage to a sufficiently low level (as shown by the dotted line B) if loading beyond point X is attempted. Where the concern is maximum power dissipation in the voltage regulating arrangement, it would be desirable for the regulating arrangement to return the output voltage to a suitable low level along a characteristic such as shown as at A, so that the power dissipation in, for example, the variable impedance 7 in Fig. 1, never will exceed the maximum selected level that was established at point X. Curve B of course provides a constant load current at overload without regard to the power dissipation.

Referring to Fig. 3 there is shown a transistorized voltage regulating arrangement in accordance with one embodiment of the present invention. Wherever possible, the circuit elements shown in Fig. 1 have been retained in Fig. 3 with the same reference numerals. In Fig. 3 transistors 14 and 15 operating in parallel serve as the variable impedance element of the regulating arrangement. In response to the control signal voltage developed at the movable tap 9, the impedance of devices 14 and 15 is adjusted in the proper direction to insure a constant voltage across load resistor 8 independent of variations in the load circuit 1 or the source 6.

The regulating arrangement of Fig. 3 comprises the following components. Transistor 16 acting as a comparator circuit has its emitter electrode 17 connected through a unidirectional conducting device 18, such as a diode rectifier, to a movable tap 9 on the output load resistor 8. Base electrode 19 is connected through the reference load resistor 20 to the load circuit terminal 3. The collector electrode 21 is connected to the base electrode 22 of a transistor 23 operating as a comparison signal amplifier. Constant voltage reference element 24, comprising, for example, a zener silicon diode, is connected between the load circuit terminal 2 and the base electrode 19 of the comparator 16. Collector electrode 25, of the amplifier 23, is connected to the load circuit terminal 3. It should be noted that the reference symbols used for transistors 14, 15 and 23 indicate that these transistors are of the NPN type, whereas the transistor 16 is of the PNP type. The collector electrodes 26 and 27 of transistors 14 and 15 are also connected to the load terminal 3. The base electrodes 28 and 29 of transistors 14 and 15 are connected together and to the emitter electrode 30 of transistor 23 through load balancing resistances 31 and 32. Emitter electrodes 33 and 34 are connected together and to the output terminals 5 of the source 6. Condenser 35 connected between the load circuit terminal 2 and the collector electrode 21 of transistor 16 operates to suppress possible parasitic oscillations during the regulation process. Resistance 36, connected between the load circuit terminal 2 and the unidirectional conducting device 18, operates in a manner to be described shortly to provide the desired overload and undervoltage protection.

The circuit arrangement of Fig. 3 operates as follows. If the voltage developed across the load resistor 8 should increase due to any variation in the source 6 or the load circuit 1, the voltage change is reflected through operation of the constant voltage device 24 and the reference load resistor 20 as a signal at the base electrode 19 of transistor 16. Since the voltage developed across the element 24 normally remains constant, due to its inherent nature of operation, any change in the voltage appearing at the terminal 2 appears in its entirety also at the base electrode 19. A portion of this increased voltage signal is developed at tap 9 and applied through the unidirectionally conducting device 18 to the emitter electrode 17. Transistor 16 operates in response to the signals developed at its base electrode 19 and its emitter electrode 17 caused by an increase in voltage across the load resistor 8 to provide an output signal in the form of a decreasing current flowing through collector 21. Conversely, if the voltage developed across load resistor 8 should decrease, again this decreasing change in voltage appears in its entirety at the base electrode 19 by operation of the device 24 and the resistor 20 and a portion of this decreasing change signal is applied to emitter electrode 17 through the diode 18, thereby resulting in an increase in collector current flowing through 21. The increasing and decreasing current flowing through 21 is applied to the base electrode 22 of transistor 23 for proper amplification. This amplified control signal is then applied through the emitter electrode 30 and the load balancing resistors 31 and 32 to the base electrodes 28 and 29 of the transistors 14 and 15. Since the effective impedance of transistors 14 and 15 is controlled by the signal current applied to their base electrodes 28 and 29, a regulating feature is obtained. Thus, an increasing control signal applied to base electrodes 28 and 29 causes the effective impedance of devices 14 and 15 to decrease, thereby causing the voltage across load resistor 8 to increase to its normally desired level. If a decreasing control signal is applied to the base electrodes of devices 14 and 15, this results in an increase in their effective impedance, thereby causing the voltage developed across load resistor 8 to decrease to its normal operating level. Thus far, the circuit arrangement of Fig. 3 has been defined as operating to provide a desired regulating control over the voltage applied to the load circuit 1.

In order to prevent the regulating arrangement of Fig. 3 from attempting to provide a regulating control over the voltage applied to the load circuit beyond a dangerous operating level, an arrangement is provided to produce a controlling effect approximating curve A of Fig. 2. Reference is made to Fig. 4 to facilitate an explanation of this feature. In Fig. 4 the output load current is plotted as abscissa and the output voltage as ordinate. The arrangement of Fig. 3 provides suitable regulation in the form of a constant output voltage out to a point C. At this point it is desired to prevent any further attempt at maintaining the output voltage constant and thereby avoid destruction of the regulating system. To this end, resistor 36 and the diode 18 are dimensioned to provide an overload or undervoltage protective feature. Since the voltage developed across resistor 36 is essentially the constant voltage developed across device 24, resistor 36 acts essentially as a constant current device supplying current to the emitter electrode 17 of transistor 16 and the diode 18. As the load circuit conditions across terminals 2 and 3 change, the current flowing through 36 is divided proportionately between emitter electrode 17 and the diode 18. When the point C is reached on the operating curve of Fig. 4, it is desired that the diode 18 cease conducting so as to prevent any further control by the signal obtained from movable tap 9. This is accomplished by dimensioning the transistor circuit 16 to insure that the bias developed between the emitter electrode 17 and the base electrode 19 is such that all current developed through resistor 36 flows through the transistor 16 when point C is reached. At this point the voltage developed at the junction of resistor 36 and the emitter electrode 17 becomes negative with respect to the voltage developed at the movable tap 9, thereby insuring cut-off of the diode. Any further increase in load current due to an overload condition provides no further increase in emitter current of transistor 16. This operates to maintain the effective impedance of transistors 14 and 15 constant for any further increase in load current. Since the regulator now operates effectively at a fixed impedance in series with the load, the voltage applied to the load circuit will fall along the curve CD with any increase in load current. When the output voltage developed across load resistor 8 falls so that it becomes insufficient to maintain device 24 in its constant voltage operating condition, then device 24 degenerates into a high impedance variable voltage device. With device 24 no longer providing a reference signal, transistor 16 is directly influenced by the output voltage developed across load resistor 8. For a decrease in the output voltage due to an attempted increase in load current beyond point D, transistor 16 is operating in a condition where its emitter current is directly proportional to the output voltage developed across load resistor 8. Any slight decrease in load resistance beyond the region D causes the emitter current at 17 to decrease causing a decrease in the control signal applied to transistors 14 and 15, thereby resulting in their effective impedance being increased. This increase in effective impedance causes the voltage developed across resistor 8 to drop further. This, in turn, causes the emitter current of 17 to further decrease, resulting in a regenerative action which quickly increases the effective impedance of transistors 14 and 15 to a high level thus causing the voltage developed across load resistor 8 to fall to a safe level and preventing any damage to the regulating arrangement or the load circuit 1.

Referring to Fig. 4, it is seen that the characteristic curve CDO is obtained for the case where device 24 of Fig. 3 has the normal operating level of voltage $E_1$. If device 24 is selected to operate at a level $E_2$, approaching more closely the voltage corresponding to point C of Fig. 4, it is possible to reduce the transitional portion of the previous curve CDO to provide that shown by curve CFO.

Besides providing the protective features described hereinabove, applicant's invention can be readily adapted to provide other desirable features. For example, by adjusting the value of the resistor 36 to, for example, twice its value, an output regulating characteristic as shown at dotted line G is obtained. Thus the single circuit arrangement of Fig. 3 can be readily modified to provide a desired protective function at different maximum output load currents. An obvious application of this adjustable feature is the inherent safety with which it can accommodate the testing of load circuits of varying power requirements with a minimum of modification.

Oftentimes in the electrical arts, it is desired to momentarily interrupt the power supplied to a load circuit. The present invention is readily capable of serving this purpose. For example, referring to Fig. 5, by introducing a controllable resistance device 37, such as a transistor circuit, between the resistance 36 and the junction formed between transistor 16 and the diode 18, it is possible by means of signals from a keying source 38 to vary the overall resistance appearing between terminal 2 and the junction formed by emitter 17 and diode 18. Thus, for example, if during normal operation the resistance of device 37 is low, the regulating arrangement is caused to operate at point H on the curve HCDO of Fig. 4 to provide a normal voltage to an output load circuit. Upon application of a suitable signal from keyer 38, such as a pulse, the resistance of 37 is increased causing the regulating arrangement to momentarily have the dotted operating characteristic G such that point H now corresponds to an overload condition whereby output voltage is momentarily reduced to a low value. Upon removal of the keying signal, the operating characteristic HCDO is again established corresponding to normal voltage being applied to the load circuit 1.

Whereas applicant has explained his invention in terms of providing a protective feature for an overload condition, it can be readily seen that the circuit will provide a protective feature for undervoltage conditions, as for example where the source voltage 6 of Fig. 3 drops to some low, unsafe value.

Specific dimensions have been given to various parts of the invention disclosed by the drawings for the purposes of explaining the features of the invention. Furthermore, while a specific embodiment has been shown and described, it will of course be understood that various modifications may yet be devised by those skilled in the art which will embody the principles of the invention and be found in the true spirit and scope thereof.

What I claim and desire to secure by Letters Patent of the United States is:

1. In combination, a voltage source, a load circuit, a regulating device coupling said source to said load circuit, said regulating device comprising a variable impedance element, said regulating device responsive to a first predetermined maximum level of load current established in said load circuit for maintaining the impedance of said device constant for any further increase in the load current, and said regulating device responsive to a second maximum level of load current to increase the resistance of said device in accordance with any further increase in said load current.

2. In combination, a supply circuit, a load circuit, a variable resistance device comprising a control element connected between said circuits, a signal comparator comprising a first, second and third control electrode, means for maintaining the potential of said first electrode substantially constant comprising a serially connected reference voltage device and an impedance element connected across said load circuit, said reference voltage device responsive to a first range of voltages for developing a constant potential across its terminals, means for applying a signal to the second of said electrodes which varies in accordance with the voltage of said load circuit, means responsive to a first predetermined maximum of load current flowing in said load circuit for blocking further application of said signal to said second control electrode, and means responsive to a second predetermined maximum of load current flowing in said load circuit for applying a signal to said control element to cause said variable resistance devices to assume a high value of resistance.

3. In combination, a voltage source, a load circuit, a regulating device coupling said voltage source to said load circuit, said regulating device comprising a variable impedance element, said regulating device responsive to variations of voltage in a first range of load current to maintain the load voltage constant, said regulating device responsive to a first predetermined maximum level of load current established in said load circuit for maintaining the resistance of said variable impedance element constant for further increases in the load current, and said regulating device responsive to a second maximum level of load current to increase the resistance of said variable impedance element and reduce the current available to the load circuit to prevent an overload.

4. In combination, a voltage source, a load circuit, a regulating device coupling said voltage source to said load circuit, said regulating device comprising a variable impedance element, said regulating device responsive to variations of voltage in a first range of load current to vary the resistance of said variable impedance element and maintain the load voltage constant, said regulating device responsive to a first predetermined maximum level of load current for maintaining the resistance of said variable impedance element at a constant value for a second range of load current, and said regulating device responsive to a second maximum level of load current to increase the resistance of said variable impedance device and reduce the current available to the load circuit to prevent an overload.

5. In combination, a source of unidirectional current, a load circuit, means for applying current from said source to said load circuit comprising a variable resistance device, a source of normally constant reference voltage, means for comparing the voltage developed across a predetermined portion of said load circuit with said reference voltage to derive a comparison signal, means for regulating the resistance of said variable resistance device in accordance with said comparison signal, means for preventing any increase in the amplitude of said comparison signal beyond a first maximum value whereby the voltage developed across said load circuit decreases with any further increase in current flowing through said load circuit, and means responsive to a selected maximum amplitude of current flowing in said load circuit for changing the value of said normally constant reference voltage whereby the resistance of said variable resistance device increases to a high value and said current flowing through said load circuit decreases to a low value.

References Cited in the file of this patent

UNITED STATES PATENTS

| | | |
|---|---|---|
| 2,693,568 | Chase | Nov. 2, 1954 |
| 2,697,811 | Deming | Dec. 21, 1954 |
| 2,751,549 | Chase | June 19, 1956 |
| 2,767,330 | Marshall | Oct. 16, 1956 |
| 2,776,382 | Jensen | Jan. 1, 1957 |